United States Patent Office.

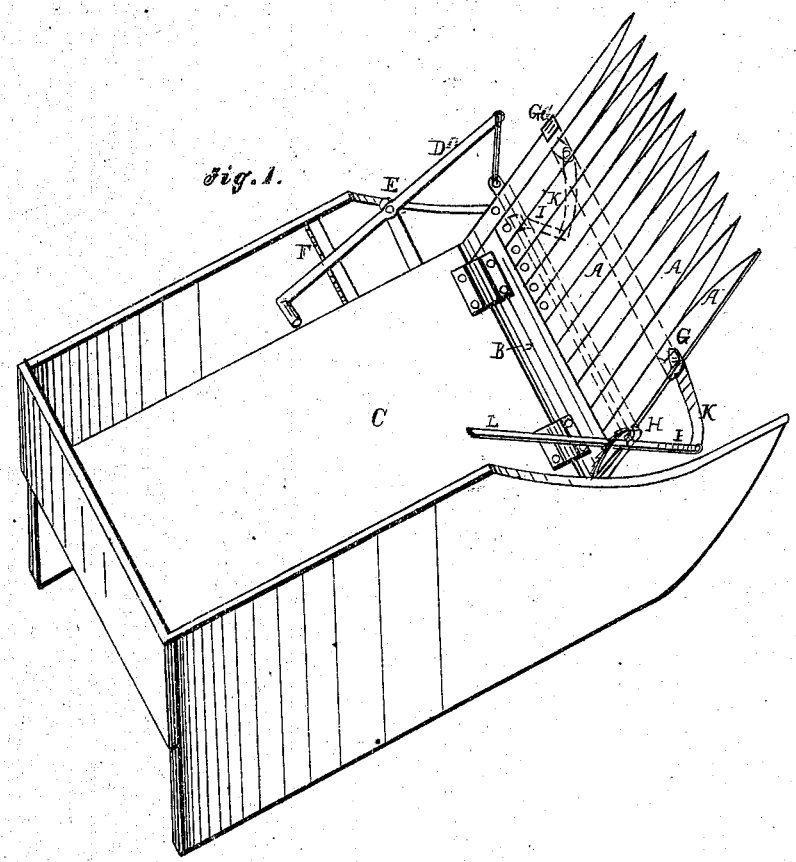
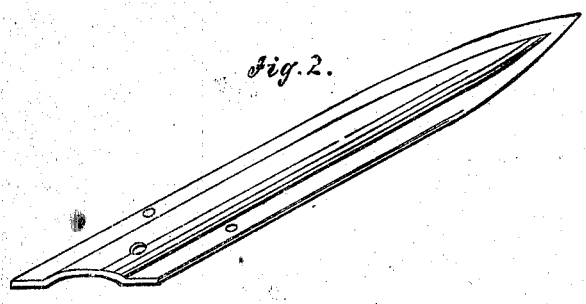

JOHN O. KING AND HIRAM A. RICE, OF LOUISIANA, MISSOURI.

Letters Patent No. 97,932, dated December 14, 1869.

GRAIN-STRIPPER.

The Schedule referred to in these Letters Patent and making part of the same.

*To all whom it may concern:*

Be it known that we, JOHN O. KING and HIRAM A. RICE, of Louisiana, in the county of Pike, and State of Missouri, have invented a new and improved Seed and Grain-Stripper; and we do hereby declare that the following is a full, clear, and exact description thereof, which will enable others skilled in the art to make and use the same, reference being had to the accompanying drawings, forming part of this specification.

The object of this invention is to provide a seed and grain-stripper with light and strong fingers, capable of adjustment, as to height, and arranged in a way to vary the spaces between the teeth at the point of stripping the heads, for straw of different sizes.

Figure 1 represents a perspective view of a machine constructed according to our improvements, and Figure 2 represents a perspective view of a finger, such as we propose to use.

Similar letters of reference indicate corresponding parts.

The fingers A are secured at one end to a hinged cross-bar, B, of the receptacle C, arranged on runners, to be moved along the ground, with the tapered points of the teeth projecting ahead and upward, so as to gather the straws between the points, below the heads, and strip off the seeds or heads, which slide down the upper faces of the teeth into the receptacle below.

It is desirable to elevate or depress the points of the teeth, according to the height of the grain or grass to be stripped, and for this reason, we connect to the transverse supporting-bar B, a lever, D, pivoted to the frame at E, and provided with a notched catch-bar, F, for holding it at any desired point. Other equivalent means may be employed for the purpose, if preferred.

It is also desirable to vary the breadth of the spaces between the fingers at the stripping-points, and this we accomplish by the employment of the sliding bar G, with the ends so lapped over the outer fingers as to be guided up and down thereon; and for operating this, we provide the rock-shaft H, having arms I, connected by links K to the said sliding bar.

This rock-shaft is also operated and secured in place by a lever, L, also provided with a notched catch-bar, M.

This bar G, sliding up along the fingers where their tapered edges diverge, varies the width of the spaces as required, or changes the stripping-point along the spaces, and prevents the straws from wedging and binding in between the said edges.

It is desirable that these fingers be made as light as possible, and for this, and to preserve the requisite strength, we make them of sheet-metal, stamped and fluted, as represented in fig. 2.

Having thus described our invention,

We claim as new, and desire to secure by Letters Patent—

The arrangement of the detent-bar M, lever L, links K, arms I, and rock-shaft H, to slide the bar G, in the manner specified.

The above specification of our invention signed by us, this 3d day of April, 1869.

JOHN O. KING.
HIRAM A. RICE.

Witnesses:
R. E. PLEASANTS,
SILAS PRATHER.